W. T. M. BRUNNEMER.
TRACTOR.
APPLICATION FILED SEPT. 30, 1912.
1,150,247.
Patented Aug. 17, 1915.
4 SHEETS—SHEET 3.
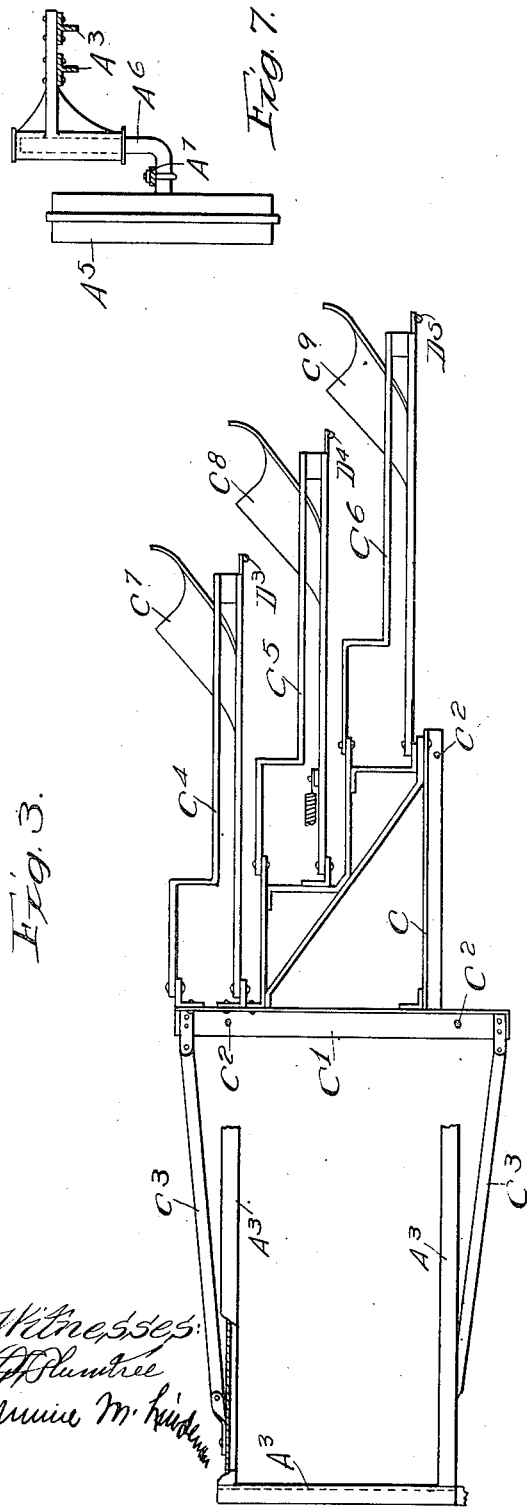
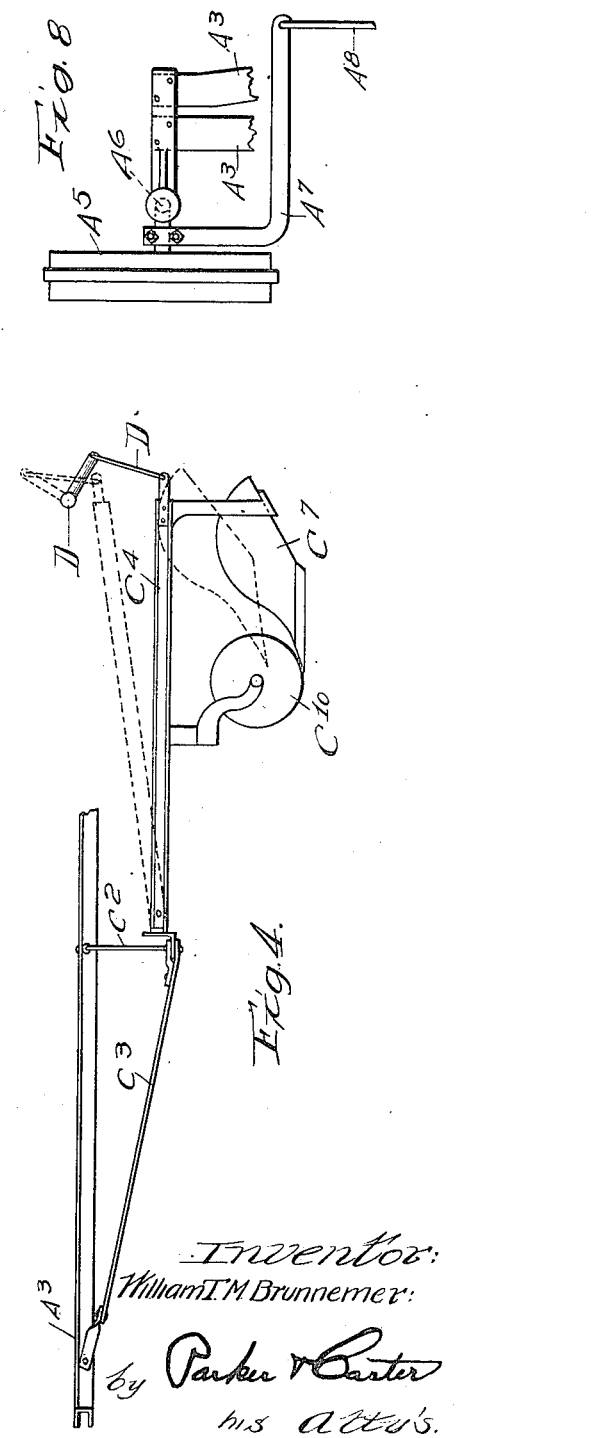

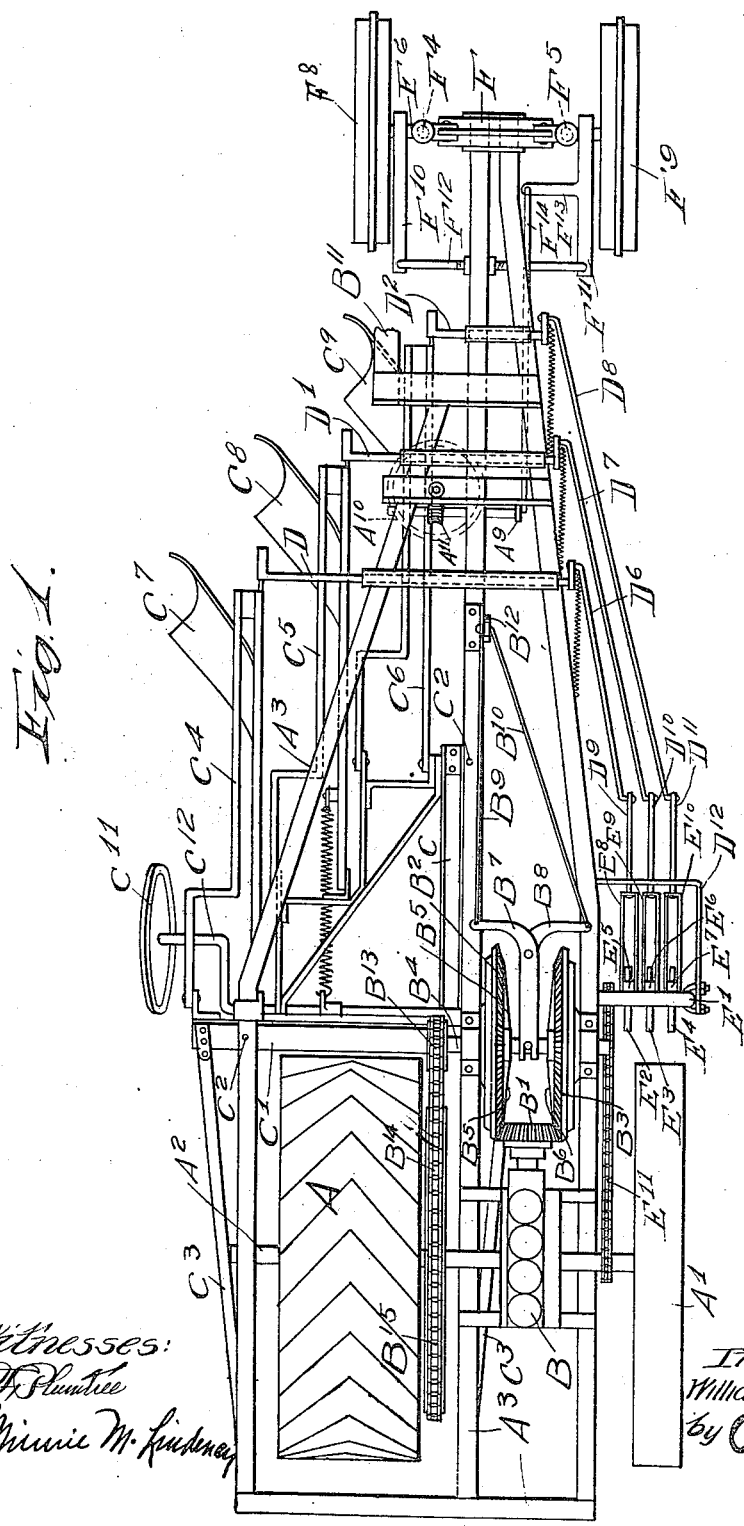

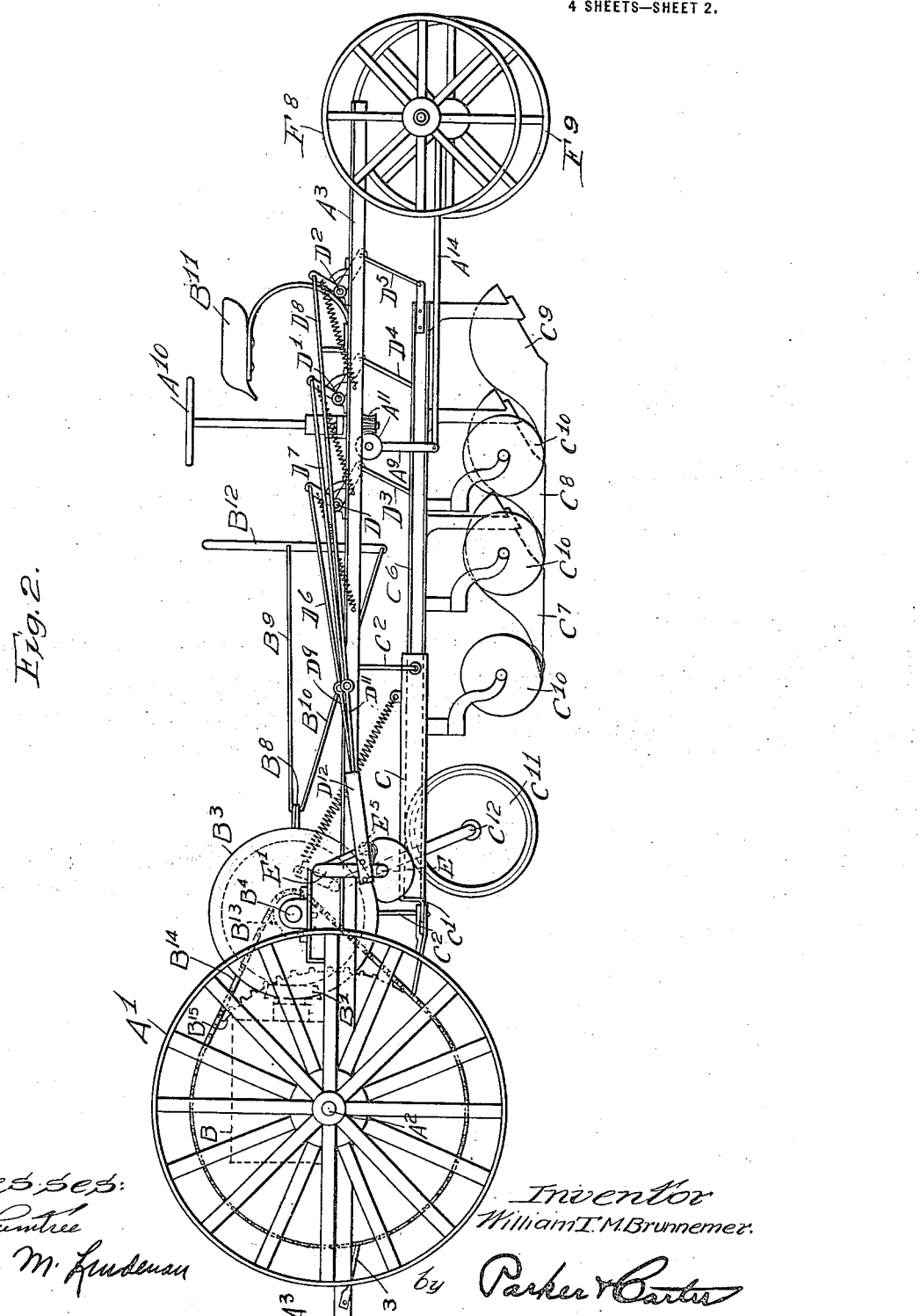

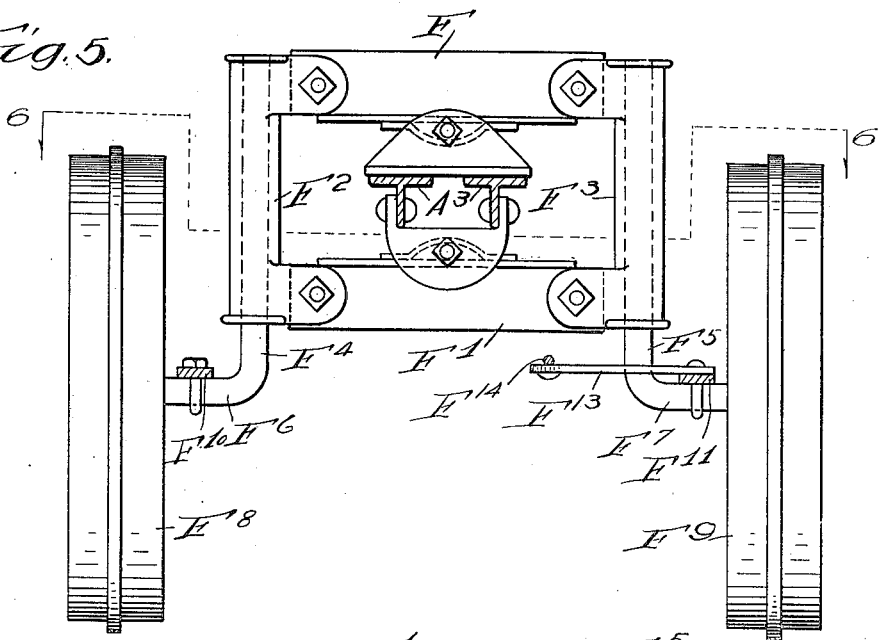
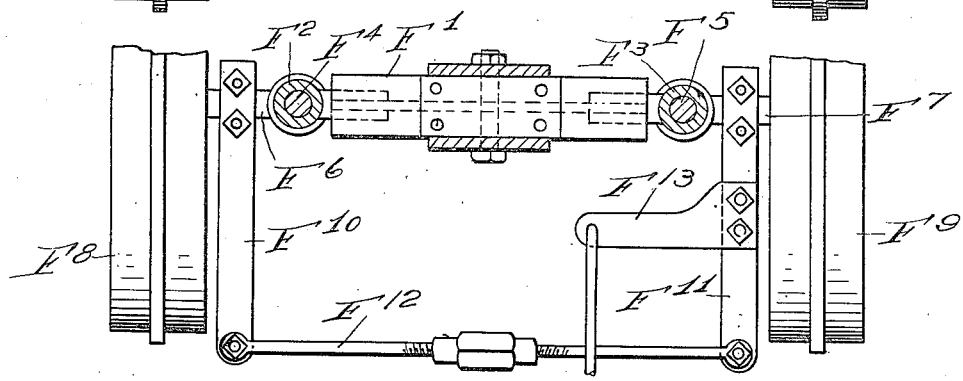
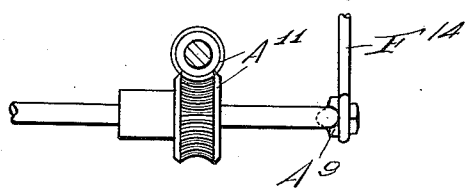

UNITED STATES PATENT OFFICE.

WILLIAM T. M. BRUNNEMER, OF RACINE, WISCONSIN, ASSIGNOR TO M. RUMELY COMPANY, OF LAPORTE, INDIANA, A CORPORATION OF INDIANA.

TRACTOR.

1,150,247.     Specification of Letters Patent.     Patented Aug. 17, 1915.

Application filed September 30, 1912. Serial No. 723,042.

*To all whom it may concern:*

Be it known that I, WILLIAM T. M. BRUNNEMER, residing at Racine, in the county of Racine, State of Wisconsin, formerly of Laporte, in the county of Laporte, State of Indiana, have invented certain new and useful Improvements in Tractors, of which the following is a specification, reference being had to the accompanying drawings.

My invention relates to tractors operated by a self-contained motor, such as a gasolene engine, and has for its object to provide certain improvements in such tractors by which the advantages hereinafter pointed out may be secured. I accomplish this object as illustrated in the drawings and as hereinafter described.

What I regard as new is set forth in the claims.

In the drawings,—Figure 1 is a plan view; Fig. 2 is a side elevation; Fig. 3 is a plan view with parts broken away of the sub-frame and connected parts; Fig. 4 is a side elevation of the sub-frame and connected parts; Fig. 5 is a side elevation of one form of steering axle and connections; Fig. 6 is a plan view of the same; Fig. 7 is an end elevation of another form of steering axle and connections; and Fig. 8 is a plan view of the same.

Referring to the drawings in which my invention is illustrated as embodied in a traction plow,—$A^3$ indicates the main frame of the machine, which is supported at the front by a main driving or traction wheel A and a ponderous idler wheel $A^1$, which are mounted upon a transverse axle $A^2$, the idler wheel $A^1$ being loosely mounted on said axle, while the traction wheel A is fixedly or non-rotatably mounted thereon. By the term "ponderous" as applied to the idler-wheel $A^1$ is meant that it is not a wheel merely of such size and shape as to be capable of assisting in supporting the machine frame, but is considerably heavier than would be required for such purpose, so that it will act as a drag and by its inertia tend to counteract the turning moment incident to the unbalanced load, as hereinafter explained. The main frame $A^3$ is supported at the rear by one or more steering wheels. In the construction shown in Fig. 1, there are two steering wheels $F^8$—$F^9$, which, as better shown in Fig. 5, are mounted on spindles $F^6$—$F^7$, having vertically-extending arms $F^4$—$F^5$, which are journaled in sleeves $F^2$—$F^3$, connected by bolts with horizontal beams F—$F^1$, fitted respectively above and below the main frame $A^3$, so that the sleeves $F^2$—$F^3$ are maintained parallel but are free to move endwise independently of each other. The spindles $F^6$—$F^7$ are provided with forwardly-projecting arms $F^{10}$—$F^{11}$, which are rigidly secured thereto and are connected at their forward ends by a connecting rod $F^{12}$. One of said arms, $F^{11}$, is provided with a finger $F^{13}$, which is rigidly secured thereto and projects laterally therefrom, as best shown in Fig. 6, said finger being connected by a link $F^{14}$ to the arm of a crank-shaft $A^9$, which carries a worm-gear $A^{11}$, the latter being operated by a steering wheel $A^{10}$, suitably mounted in the frame of the machine, preferably at the rear end thereof, as best shown in Fig. 1. Instead of using the two steering wheels above described, however, I prefer to employ the construction shown in Figs. 7 and 8, in which a single steering wheel $A^5$ is employed, mounted on a spindle $A^6$, similar to the spindles $F^6$—$F^7$, the vertical portion of said spindle being journaled in a sleeve suitably secured to the rear portion of the main frame $A^3$, as shown in said figures. The spindle $A^6$ is provided with a steering arm $A^7$, which is connected by a link $A^8$ with the crank $A^9$. In this construction the steering wheel $A^5$ is located at one side of the transverse center of the machine, being nearer to the driving wheel side than to the idler wheel side thereof.

$C^7$—$C^8$—$C^9$ indicate a series of plows, any desired number of which may be employed, which plows are provided with beams $C^4$—$C^5$—$C^6$, respectively, which are pivoted at their forward ends to a plow frame C of suitable shape so that the several plows are disposed in the manner common to gang plows. The frame C is provided at the front with a transverse bar $C^1$, through which it is suspended from the main frame $A^3$, by means of links $C^2$.

$C^3$ indicates draft links, the forward ends of which are pivotally connected with the front portion of the main frame $A^3$, in advance of the axle $A^2$, their rear ends diverging slightly and being pivotally connected to the end portions of the cross-bar $C^1$. By this construction the draft of the plows tends to increase the traction of the traction wheel, as such draft is applied to the main frame in advance of the axle $A^2$, and consequently the line of draft lies below the line of such axle and tends to draw down thereupon. This construction also holds the plow frame and plows against turning appreciably, but allows the plows to swing laterally to follow the traction wheel when the direction of its movement is changed, instead of in the opposite direction as they would if hitched to the frame back of the axle $A^2$. The plow beams have no lateral movement independently of the plow frame, although they are free to swing vertically.

$C^{10}$ indicates gage wheels, one of which is carried by each plow beam $C^4$—$C^5$—$C^6$, said gage wheels being arranged in the usual way.

$C^{11}$ indicates a guide wheel, mounted on a pivoted shaft $C^{12}$, which is journaled in the plow frame C and projects laterally at the furrow side of the plow, as shown in Fig. 1.

It will be noted that the line of travel of the plow $C^7$ is at a considerable distance beyond the furrow side of the traction wheel A and consequently said traction wheel travels at a sufficient distance from the line of the previous furrow so that it does not break down the land by its weight, leaving the edge of the furrow straight and sharp, and while the effective line of draft of the furrow-openers, or the plows, is at the furrow side of the center of the traction wheel and consequently creates a turning moment which tends to cause the traction wheel to turn toward the furrow, this turning moment is opposed and compensated for by the idler-wheel $A^1$ which, owing to the resistance caused by the roughness of the ground, acts as a drag which tends to turn the traction wheel in the opposite direction and consequently practically neutralizes the turning moment created by the draft of the furrow-openers.

B indicates the motor by which the axle $A^2$ is rotated. As shown in Fig. 1, the motor drives a miter pinion $B^1$, which engages oppositely-disposed beveled gears $B^2$—$B^3$, which gears are loosely mounted upon a counter-shaft $B^4$. Clutches $B^5$—$B^6$ are fitted upon the counter-shaft $B^4$ between said beveled gears $B^2$—$B^3$, so as to move longitudinally said shaft, meanwhile rotating therewith. Thus by moving one or the other of said clutches into engagement with one or the other of said gears $B^2$—$B^3$, the gear so engaged may be caused to rotate the counter-shaft $B^4$, thereby rotating said counter-shaft in one direction or the other, depending on the gear which is engaged. The counter-shaft $B^4$ carries a sprocket-wheel $B^{13}$, which, as shown in Fig. 1, is connected to a sprocket-wheel $B^{15}$, rigidly mounted on the axle $A^2$, by a chain $B^{14}$; thus the axle $A^2$ and the main traction wheel A are rotated by the rotation of the counter-shaft $B^4$. The clutches $B^5$—$B^6$ are operated to move them into engagement with one or the other of the gears $B^2$—$B^3$, by bellcrank levers $B^7$—$B^8$, as best shown in Figs. 1 and 2, said levers being connected by links $B^9$—$B^{10}$, with a controlling lever $B^{12}$, placed convenient to the driver's seat $B^{11}$, shown in Fig. 2, so that by operating said lever the clutches may be shifted as desired to cause the machine to advance, to back, or to stop.

For the purpose of raising and lowering the plows by power from the engine B, I provide crank-shafts D—$D^1$—$D^2$, best shown in Figs. 1 and 4, which crank shafts are rotatably mounted on the main frame $A^3$ and are connected respectively at one end by means of links $D^3$—$D^4$—$D^5$, shown in Fig. 2, to the plow beams $C^4$—$C^5$—$C^6$, respectively. The other ends of said crank-shafts are connected by links $D^6$—$D^7$—$D^8$, as best shown in Fig. 1, to sliding links $D^9$—$D^{10}$—$D^{11}$, which are slidably mounted on a bracket $D^{12}$, as best shown in Fig. 1, so that they may be moved longitudinally of the machine. Said links are connected to yokes $E^8$—$E^9$—$E^{10}$, which carry cam rollers $E^5$—$E^6$—$E^7$, operated by cams $E^2$—$E^3$—$E^4$, carried by the cam shaft E, mounted in a bracket $E^1$, as shown in Figs. 1 and 2. The cam shaft E is connected by any suitable clutch mechanism, (which for the sake of clearness, is not shown), with the axle $A^2$, by means of a sprocket chain $E^{11}$, shown in Fig. 1, the arrangement being such that the operator may operatively connect or disconnect the cam-shaft with the axle $A^2$, to raise or lower the plows by power.

The operation of my improved machine is as follows: The operator starts the engine, and by throwing the proper clutch into engagement, drives the machine forward, steering it by means of the steering wheel in the usual manner. It is the rear not the front wheels that does the steering, since the drive wheel goes first. When he reaches the point where he wishes to commence plowing, he throws the clutch to permit the plows to be lowered and as they reach the ground they commerce to make the furrow. The peculiar arrangement of the draft links connecting the plow frame with the tractor frame is such that there is a tendency to increase the traction when the load increases, because an increase in the load will tend to increase the pull required, and this pull will divide itself as soon as applied to the tractor frame through the inclined links into two components, one of them a vertical and one of them a horizontal. The vertical component will, of course, tend to increase the downward pressure of the tractor wheel beyond that due to the mere force of gravity, and thus the tractive power of the driving wheel will be very materially increased. Moreover, this downward component will tend to prevent the tractor from lifting itself out of the ground and slipping on the smooth surface.

The pivotal arrangement of the two draft links together with the swinging support of the plow frame permits the plows to swing laterally slightly with reference to the traction wheel. The advantage of this is that with the guide wheel in the previous furrow the plows are free to follow a line parallel with the previous furrow, in the event that the operator may not steer a course exactly the same as his previous course. When this happens, the only difficulty that can arise will be that the line of pull of the plows will not follow exactly the usual straight ahead direction, although it will approximate it closely. Moreover, when the plow is turned, it will be evident that if the plow beams were not free to move laterally the lateral movement accompanying the turning of the plow frame would exert a breaking stress upon the plow beams. This stress, if it did not quite break the beams or plows, would probably distort them and would certainly render plowing very much harder on account of the increased traction required to overcome the increased friction. By my arrangement, with the swinging plow frame the plows are enabled to gradually change their direction and thus can take an easy curve such as they can follow without difficulty, instead of being forced to follow a sharp curve, which might be disastrous.

As has been explained, the outside plow C⁷ is so placed with reference to the traction wheel as to travel in a line lying a considerable distance beyond the furrow wheel side of said traction wheel and consequently the traction wheel travels at a sufficient distance from the line of the previous furrow so that it does not break down the bank. The line of draft of the plows, taken together, is at the furrow side of the center of the traction wheel, and the traction wheel being free to turn to one side or the other this off-center draft would accordingly create a turning moment which, in the absence of compensating mechanism, would cause the traction wheel to turn toward the furrow. This compensation is provided by the idler wheel connected at the land side of the traction wheel. Owing to the roughness of the ground, as well as to the inertia of the idler-wheel, considerable power is required to move it, so that it acts as a drag upon the traction wheel which creates a turning moment opposite to that created by the off-center draft of the furrow-openers, the result being that these turning moments practically neutralize each other, and the traction wheel follows a substantially straight line, pursuing a path sufficiently far away from the edge of the previous furrow to avoid breaking down its bank. In practice it is not necessary that the two opposite turning moments referred to be exactly equal, as for practical purposes, approximate neutralization of, or compensation for the turning moment due to the off-center draft of the furrow-openers, is all that is necessary.

The plow-beams being each composed of two members which are spaced apart and pivoted to the frame, are held laterally rigid, that is to say, the plow beams cannot separately rotate about a vertical axis, but must continue forward following a line parallel with the longitudinal axis of the plow frame. I am thus enabled to do away with the usual landside, which has for its function to keep the plow in line and to overcome the turning tendency, since this tendency is overcome by the attachment of the plows to the frame, and I avoid the friction which would result from drawing the landside against the ground. Furthermore, less power is required to control the plows themselves. In Figs. 7 and 8 I have shown a single steering wheel attached to the rear of the frame. This wheel is set to one side so that when the plows are lifted the weight is largely carried in line with the steering wheel, thus doing away with any torsional strain in the plow frame and substantially balancing the weight of the plow beams and the plows between the driving wheel and the rear wheel, in order that the idler wheel need not carry too great a load. In the form shown in Fig. 1, the two steering wheels on the pivoted axles permit the two wheels to conform to irregularities in the ground and thus do away with the danger of torsional stresses in the frame.

In the claims I have used the term "power-driven traction-wheel," but it will be understood that that term is intended to include not only wheels strictly speaking, but also all other power-driven propelling-devices capable of being used in place thereof for the purpose described. Furthermore, I wish it to be understood that my invention is a generic one, as, so far as I am aware, I am the first in the art to employ a power-driven propeller in connection with furrow-openers arranged to be drawn thereby and so arranged as to tend by their draft to turn the propeller toward the furrow side of the machine, in combination with means for opposing the turning moment due to the draft of the furrow-openers. The claims hereinafter made are, therefore, to be construed accordingly.

While my invention is designed with special reference to its embodiment in a traction plow, my improved tractor is also well adapted for drawing other unsymmetrical loads, such as mowing machines, self-binders, etc., and I wish it to be understood that my invention includes the application of the tractor to any use to which it is adapted.

That which I claim as my invention, and desire to secure by Letters Patent, is,—

1. A tractor, comprising a power-driven traction-wheel, a load arranged to be drawn by said traction-wheel and tending by its draft to turn the traction-wheel toward one side of the machine, and a ponderous idler-wheel at the opposite side of the machine tending by its inertia to neutralize the turning moment due to the draft of the load.

2. A tractor, comprising a power-driven traction-wheel, a load back of and drawn by said traction-wheel, the effective line of draft of said load being at one side of the center of said traction-wheel, and a ponderous idler-wheel at the other side of the machine for opposing the turning moment due to the draft of the load.

3. A tractor, comprising a power-driven traction-wheel, a load back of and drawn by said traction-wheel and projecting beyond one side thereof, and a ponderous idler-wheel at the other side of the machine for opposing the turning moment due to the draft of the load.

4. A tractor, comprising a power-driven traction-wheel, a load arranged to be drawn by said traction-wheel and tending by its draft to turn the traction-wheel toward one side of the machine, and a ponderous idler-wheel at the front of the machine and on the opposite side thereof, acting in opposition to the turning moment due to the draft of the load.

5. A tractor, comprising a power-driven traction-wheel, a load arranged to be drawn by said traction-wheel and tending by its draft to turn the traction-wheel toward one side of the machine, and a ponderous idler-wheel substantially in axial alinement with said traction-wheel acting in opposition to the turning moment due to the draft of the load.

6. A tractor, comprising a power-driven traction-wheel, a load arranged to be drawn by said traction-wheel and projecting beyond one side thereof, and a ponderous idler-wheel at the front of the machine and on the opposite side thereof, acting in opposition to the turning moment due to the draft of the load.

7. A tractor, comprising a power-driven traction-wheel, a load arranged to be drawn by said traction-wheel and tending by its draft to turn the traction-wheel toward one side of the machine, means for opposing the turning moment due to the draft of the load, and steering means at the rear of the machine.

8. A tractor, comprising a power-driven traction-wheel, a load arranged to be drawn by said traction-wheel and tending by its draft to turn the traction-wheel toward one side of the machine, a ponderous idler-wheel at the opposite side of the machine which substantially neutralizes the turning moment due to the draft of the load, and steering means.

9. A tractor, comprising a power-driven traction-wheel, a load arranged to be drawn by said traction-wheel and projecting beyond one side thereof, a ponderous idler-wheel at the other side of the machine for opposing the turning moment due to the draft of the load, and steering means at the rear of the machine.

10. A tractor, comprising a power-driven traction-wheel, a frame in which said traction-wheel is mounted, a load arranged to be drawn by said traction-wheel and tending by its draft to turn the traction-wheel toward one side of the machine, draft-devices connected with the load and with said frame in advance of the axis of the traction-wheel, and means for opposing the turning moment due to the draft of the load.

11. A tractor, comprising a power-driven traction-wheel, a frame in which said traction-wheel is mounted, a load arranged to be drawn by said traction-wheel and tending by its draft to turn the traction-wheel toward one side of the machine, laterally-swinging draft-devices connected with said load and with said frame at opposite sides of the traction-wheel, and means for opposing the turning moment due to the draft of the load.

12. A tractor, comprising a power-driven traction-wheel, a frame in which said traction-wheel is mounted, a load arranged to be drawn by said traction-wheel and tending by its draft to turn the traction-wheel toward one side of the machine, laterally-swinging draft-devices connected with said load and with said frame at opposite sides of the traction-wheel in advance of the axis thereof, and means for opposing the turning moment due to the draft of the load.

13. A tractor, comprising a power-driven traction-wheel, a frame in which said traction-wheel is mounted, a load arranged to be drawn by said traction wheel and tending by its draft to turn the traction-wheel toward one side of the machine, laterally-swinging draft-devices connected with said load and with said frame at opposite sides of the traction-wheel, said load being laterally rigid with reference to said frame, and means for opposing the turning moment due to the draft of the load.

14. A tractor, comprising a power-driven traction-wheel, a frame in which said traction-wheel is mounted, laterally-rigid draft means connected with said frame, the effective line of draft of the load being at one side of the center of said traction-wheel, and a ponderous idler-wheel at the opposite side of the machine, for opposing the turning moment due to the draft of the load.

15. A tractor, comprising a main frame, a power-driven traction-wheel at the front thereof, a load arranged to be drawn by said traction-wheel, the draft connections of said load being connected with said frame in advance of the traction-wheel axis, and a greater or less portion of the load being arranged to project beyond the traction-wheel at one side thereof, and means at the opposite side of the machine for opposing the turning moment due to the draft of said load.

16. A tractor, comprising a power-driven traction-wheel, draft connections adapted for the connection of an unsymmetrical load to the tractor so that the load tends by its draft to turn the traction-wheel toward one side of the machine, said draft connections being adapted to swing laterally, and means for opposing the turning moment due to the draft of the load.

17. A tractor, comprising a power-driven traction-wheel, draft connections adapted for the connection of an unsymmetrical load to the tractor so that the load tends by its draft to turn the traction-wheel toward one side of the machine, said draft connections being adapted to swing laterally, and means at the opposite side of the machine for opposing the turning moment due to the draft of the load.

18. A tractor, comprising a power-driven traction-wheel, draft connections adapted for the connection of an unsymmetrical load to the tractor so that the load tends by its draft to turn the traction-wheel toward one side of the machine, said draft connections being adapted to swing laterally, and an idler-wheel at the opposite side of the machine for opposing the turning moment due to the draft of the load.

19. A tractor, comprising a power-driven traction-wheel, draft connections adapted for the connection of an unsymmetrical load to the tractor so that the load tends by its draft to turn the traction-wheel toward one side of the machine, and a ponderous idler-wheel in substantial axial alinement with the traction-wheel for opposing the turning moment due to the draft of the load.

20. A tractor comprising a frame, a power-driven traction-wheel at the forward portion thereof, steering means back of said traction-wheel, a load arranged to be drawn by said traction-wheel and tending by its draft to turn the traction-wheel in a lateral direction, and means for opposing the turning moment due to the draft of the load.

21. A tractor comprising a frame, a power-driven traction-wheel at the forward portion thereof, steering means back of said traction-wheel, a load arranged to be drawn by said traction-wheel and tending by its draft to turn the traction-wheel in a lateral direction, said load being disposed back of the traction-wheel and forward of the steering wheel, and means for opposing the turning moment due to the draft of the load.

22. A tractor comprising a frame, a power-driven traction-wheel, a load adapted to be drawn by said traction-wheel and tending by its draft to turn the traction-wheel in a lateral direction, laterally-swinging draft connections for said load, and means for opposing the turning moment due to the draft of the load.

23. A tractor comprising a frame, a power-driven traction-wheel at the forward portion thereof, steering means back of said traction-wheel, a load arranged to be drawn by said traction-wheel and tending by its draft to turn the traction-wheel in a lateral direction, and an idler-wheel substantially in axial alinement with said traction-wheel for opposing the turning moment due to the draft of the load.

24. A tractor comprising a frame, a power-driven axle mounted transversely in said frame, a traction-wheel mounted on and secured to said axle, steering means, a load arranged to be drawn by said traction-wheel and tending by its draft to turn the traction wheel in a lateral direction, and means comprising a ponderous idler-wheel for opposing the turning moment due to the draft of the load.

25. A tractor comprising a frame, a power-driven axle mounted transversely in said frame, a traction-wheel mounted on and secured to said axle, steering means, a load arranged to be drawn by said traction-wheel and tending by its draft to turn the traction-wheel in a lateral direction, and a ponderous idler-wheel loosely mounted on said axle and acting to oppose the turning moment due to the draft of the load.

26. A tractor comprising a frame, a power-driven axle mounted transversely in said frame, a traction-wheel mounted on and secured to said axle, steering means, a load arranged to be drawn by said traction-wheel and tending by its draft to turn the traction-wheel in a lateral direction, laterally-swinging draft connections for the load, and means for opposing the turning moment due to the draft of the load.

27. A tractor comprising a frame, a power-driven axle mounted transversely in said frame, a traction-wheel mounted on and secured to said axle, steering means back of said traction-wheel, a load arranged to be drawn by said traction-wheel and tending by its draft to turn the traction-wheel in a lateral direction, and means for opposing the turning moment due to the draft of the load.

Signed at Chicago, Illinois, this 23d day of September, 1912.

WILLIAM T. M. BRUNNEMER.

Witnesses:
GENEVA HUTH,
LULU JORDAN.